Patented Nov. 18, 1924.

1,516,377

UNITED STATES PATENT OFFICE.

ANTOINE REGNOUF DE VAINS, OF MIRIBEL, AIN, FRANCE.

PROCESS OF RENDERING CHLORIDES OF KETONES SOLUBLE BY MEANS OF ALKALIES.

No Drawing.   Application filed December 11, 1922.   Serial No. 606,294.

*To all whom it may concern:*

Be it known that I, ANTOINE REGNOUF DE VAINS, citizen of the Republic of France, residing at Miribel, Ain, France, have invented new and useful Improvements in Processes of Rendering Chlorides of Ketones Soluble by Means of Alkalies, of which the following is a specification.

My Patent No. 1,445,495 of February 13, 1923, has as its object to render soluble the chlorides of ketones formed by the action of chlorine upon a ligno or pecto cellulose, and the solution of the oxidized organic products formed by the action of chlorine upon a semi-pulp of cellulose, the solvent used being spent alkaline liquors derived from the lixiviation of cellulosic materials.

I have discovered that, instead of treating the ketonic chlorides by means of spent liquors, solution of these chlorides can be effected by transforming the sodic element contained in the spent liquors into sodium carbonate by the action of carbon dioxide. The ketonic chlorides are soluble in solutions of sodium carbonate.

It is then sufficient to treat the spent liquors with the reagent referred to above. A precipitate of more or less well defined materials is obtained and, by filtration, a clear liquid results which can be used for rendering soluble the ketonic chlorides formed.

I have also found that the rendering soluble of the ketonic chlorides can be effected by using spent organic liquors at any degree of concentration, originating from the washing of any organic matter which has been lixiviated by alkalies. In this case the rendering soluble of the ketonic chlorides takes place under the action of free or combined alkalies contained in the water used to wash the lixiviated matter, the strong juices extracted directly from the lixiviated matter being capable of use for other reactions. In this case, the lixiviated material is washed with hot or cold water and then extracted by suitable means. The lixivated material could also be defibrated, washed by known processes and the water used for washing could be collected and treated by carbonic anhydride as explained above.

The improvements described in the present specification permit, as do the improvements described in the above mentioned patent, of neutralizing the excess chlorine introduced during the chlorination reaction and of neutralizing the hydrochloric acid formed by the chlorination reaction and of dissolving the chlorinated or oxidized organic products formed by the action of the chlorine on the ligno- and pecto-cellulose or upon a semi-pulp of cellulose.

I claim:

1. A process for rendering soluble, by means of spent alkaline liquors derived from the lixiviation of cellulose materials, the chlorides of ketone contained in a cellulose pulp treated with chlorine, consisting in treating said liquors with carbon dioxide, in filtering the resulting liquid and in mixing it with the cellulose pulp.

2. A process for rendering soluble, by means of spent liquors, the chlorides of ketones contained in a cellulose pulp treated with chlorine, consisting in treating with carbon dioxide a weak sodic liquor, resulting from the washing of cellulosic material previously lixiviated by means of a relatively strong sodic liquor, in filtering the resulting liquid and in mixing it with the cellulose pulp.

ANTOINE REGNOUF DE VAINS.